(12) United States Patent
Danilchenko et al.

(10) Patent No.: US 12,469,042 B1
(45) Date of Patent: Nov. 11, 2025

(54) SYSTEM FOR GENERATING A NON-FUNGIBLE TOKEN INCLUDING MUTABLE AND IMMUTABLE ATTRIBUTES AND RELATED METHODS

(71) Applicant: Inmar Clearing, Inc., Winston-Salem, NC (US)

(72) Inventors: Victor Danilchenko, South Hadley, MA (US); Kevin R. Goode, Clemmons, NC (US); Gregory L Kerr, Naples, FL (US); John Wheeler, Greensboro, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 159 days.

(21) Appl. No.: 18/232,315

(22) Filed: Aug. 9, 2023

(51) Int. Cl.
*G06Q 30/0207* (2023.01)

(52) U.S. Cl.
CPC ................................ *G06Q 30/0207* (2013.01)

(58) Field of Classification Search
CPC .................................................. G06Q 30/0207
See application file for complete search history.

(56) References Cited

U.S. PATENT DOCUMENTS

| | | | |
|---|---|---|---|
| 10,373,129 | B1 | 8/2019 | James et al. |
| 2019/0108542 | A1 | 4/2019 | Durvasula et al. |
| 2021/0256070 | A1 | 8/2021 | Tran et al. |
| 2022/0318852 | A1 | 10/2022 | Blaikie, III et al. |
| 2023/0102525 | A1* | 3/2023 | Nagao .................... H04L 63/10 705/51 |
| 2023/0177489 | A1* | 6/2023 | Chan .................. G06Q 20/3672 705/66 |
| 2023/0274244 | A1* | 8/2023 | Quigley ................. G06F 21/602 705/65 |
| 2023/0360032 | A1* | 11/2023 | Lee .......................... G06Q 20/12 |
| 2024/0005305 | A1* | 1/2024 | Rush .................. G06Q 30/0242 |
| 2024/0378652 | A1* | 11/2024 | Steele, III ............. G06F 3/0484 |

OTHER PUBLICATIONS

Danilchenko et al., U.S. Appl. No. 18/137,283, filed Apr. 20, 2023.
Danilchenko et al., U.S. Appl. No. 18/206,994, filed Jun. 7, 2023.

* cited by examiner

*Primary Examiner* — Azam A Ansari
(74) *Attorney, Agent, or Firm* — ALLEN, DYER, DOPPELT, + GILCHRIST, P.A.

(57) ABSTRACT

An NFT processing server may cooperate with a first device to communicate a notification of a digital promotion having an acceptance rule set associated therewith. A tethered non-fungible token (tNFT) representative of the promotion may be generated and stored on a blockchain network. The tNFT may have an immutable attribute including a reference to the rule set, and a mutable attribute indicative of rule set acceptance. A first shopper may be prompted for rule set acceptance, and, thereupon, the server may set the mutable attribute to be indicative of the acceptance, permit transfer of the digital promotion to a second device, and transfer the promotion on the blockchain network to the second device by transferring the tNFT to a digital wallet. The server may also prompt a second shopper for acceptance of the rule set, and thereupon, set the mutable attribute to be indicative of the acceptance.

22 Claims, 6 Drawing Sheets

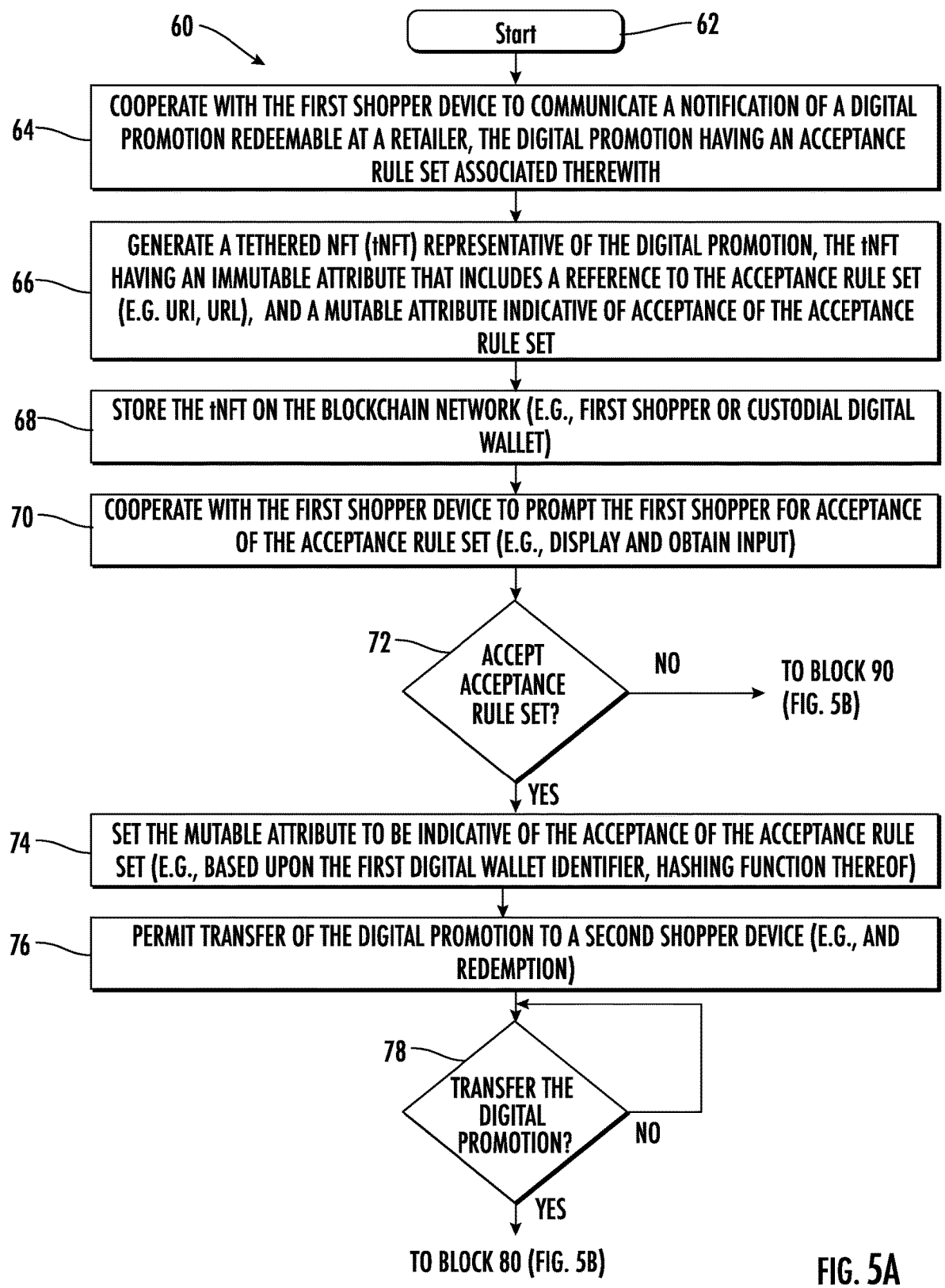

SYSTEM FOR GENERATING A NON-FUNGIBLE TOKEN INCLUDING MUTABLE AND IMMUTABLE ATTRIBUTES AND RELATED METHODS

TECHNICAL FIELD

The present invention relates to the field of non-fungible tokens (NFTs), and, more particularly, to NFT based digital wallet processing and related methods.

BACKGROUND

A non-fungible token (NFT) is a unique digital identifier that generally cannot be copied, substituted, or subdivided, that is recorded in a blockchain network, and that may serve as basis for verifying ownership. The ownership of an NFT is typically recorded in a blockchain network and can be transferred by the owner, allowing NFTs to be sold and traded. Some NFTs may have rules associated with it, for example, rules that accompany the item for which the NFT represents.

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period. Other promotional terms may include companion product and purchase quantity requirements.

SUMMARY

A non-fungible token (NFT) system may include a first shopper device associated with a first shopper, and a second shopper device associated with a second shopper. The second shopper may have a second shopper digital wallet on a blockchain network. The NFT system may also include an NFT processing server configured to cooperate with the first shopper device to communicate a notification of a digital promotion having an acceptance rule set associated therewith, and generate a tethered NFT (tNFT) representative of the digital promotion and store the tNFT on the blockchain network. The tNFT may have an immutable attribute including a reference to the acceptance rule set, and a mutable attribute indicative of acceptance of the acceptance rule set.

The NFT processing server may also be configured to cooperate with the first shopper device to prompt the first shopper for acceptance of the digital promotion by accepting the acceptance rule set, and, upon acceptance of the acceptance rule set by the first shopper, set the mutable attribute to be indicative of the acceptance of the acceptance rule set, permit transfer of the digital promotion to the second shopper device, and cooperate with the first shopper device to transfer the digital promotion on the blockchain network to the second shopper device by transferring the tNFT to the second shopper digital wallet. The NFT processing server may also be configured to, upon acceptance of the acceptance rule set by the first shopper, cooperate with the second shopper device to prompt the second shopper for acceptance of the digital promotion by accepting the acceptance rule set, and upon acceptance of the acceptance rule set by the second shopper, set the mutable attribute to be indicative of the acceptance of the acceptance rule set by the second shopper.

The first shopper may have a first shopper digital wallet on the blockchain network having a first shopper digital wallet identifier associated therewith. The NFT processing server may be configured to set the mutable attribute to be indicative of the acceptance of the acceptance rule set based upon the first shopper digital wallet identifier, for example. The NFT processing server may be configured to set the mutable attribute based upon application of a hashing function to the first shopper identifier, for example.

The second shopper digital wallet may have a second shopper digital wallet identifier associated therewith. The NFT processing server may be configured to set the mutable attribute to be indicative of the acceptance of the acceptance rule set based upon the second shopper digital wallet identifier, for example. The NFT processing server may be configured to set the mutable attribute based upon application of a hashing function to the second shopper identifier, for example.

The acceptance rule set may have an acceptance rule set identifier associated therewith. The NFT processing server may be configured to set the mutable attribute to be indicative of acceptance of the acceptance rule set based upon acceptance rule set identifier, for example.

The immutable attributes may include one of a uniform resource locator (URL) and a uniform resource identifier (URI) to the acceptance rule set. The first shopper may have a first shopper digital wallet on the blockchain network, and the NFT processing server may be configured to store the tNFT in the first shopper digital wallet on the blockchain network upon acceptance of the acceptance rule set by the first shopper, for example.

The NFT processing server may be configured to store the tNFT in a custodial digital wallet on the blockchain network upon acceptance of the acceptance rule set by the first shopper. The NFT processing server may be configured to cooperate with the first shopper device to display the acceptance rule set and obtain input from the first shopper indicative of the acceptance, for example.

The NFT processing server may be configured to cooperate with the second shopper device to display the acceptance rule set and obtain input from the second shopper indicative of the acceptance. The NFT processing server may be configured to, upon acceptance of the acceptance rule set, permit redemption of the digital promotion.

A method aspect is directed to a method of processing a non-fungible token (NFT). The method may include using a NFT processing server to cooperate with a first shopper device associated with a first shopper to communicate a notification of a digital promotion having an acceptance rule set associated therewith, and generate a tethered NFT (tNFT) representative of the digital promotion and store the tNFT on a blockchain network. The tNFT may have an immutable attribute that includes a reference to the acceptance rule set, and a mutable attribute indicative of acceptance of the acceptance rule set. The method may also include using the NFT processing server to cooperate with the first shopper device to prompt the first shopper for acceptance of the digital promotion by accepting the acceptance rule set, and, upon acceptance of the acceptance rule set by the first shopper, set the mutable attribute to be indicative of the acceptance of the acceptance rule set, and permit transfer of the digital promotion to a second shopper device associated with a second shopper.

The method may also include using the digital wallet processing server to, upon acceptance of the acceptance rule set by the first shopper cooperate with the first shopper device to transfer the digital promotion on the blockchain network to the second shopper device by transferring the tNFT to a second shopper digital wallet on the blockchain network, and cooperate with the second shopper device to prompt the second shopper for acceptance of the digital promotion by accepting the acceptance rule set. The method may further include using the NFT processing server to, upon acceptance of the acceptance rule set by the second shopper, set the mutable attribute to be indicative of the acceptance of the acceptance rule set by the second shopper.

A computer readable medium aspect is directed to a non-transitory computer readable medium for processing a non-fungible token (NFT). The non-transitory computer readable medium includes computer executable instructions that when executed by a processor cause the processor to perform operations. The operations may include cooperating with a first shopper device associated with a first shopper to communicate a notification of a digital promotion having an acceptance rule set associated therewith, and generating a tethered NFT (tNFT) representative of the digital promotion and store the tNFT on a blockchain network. The tNFT may have an immutable attribute that includes a reference to the acceptance rule set, and a mutable attribute indicative of acceptance of the acceptance rule set. The operations may also include cooperating with the first shopper device to prompt the first shopper for acceptance of the digital promotion by accepting the acceptance rule set, and, upon acceptance of the acceptance rule set by the first shopper setting the mutable attribute to be indicative of the acceptance of the acceptance rule set, and permitting transfer of the digital promotion to a second shopper device associated with a second shopper.

The operations further include, upon acceptance of the acceptance rule set by the first shopper, cooperating with the first shopper device to transfer the digital promotion on the blockchain network to the second shopper device by transferring the tNFT to a second shopper digital wallet on the blockchain network, and cooperating with the second shopper device to prompt the second shopper for acceptance of the digital promotion by accepting the acceptance rule set, and upon acceptance of the acceptance rule set by the second shopper, setting the mutable attribute to be indicative of the acceptance of the acceptance rule set by the second shopper.

BRIEF DESCRIPTION OF THE DRAWINGS

FIGS. 5A and 5B are flow diagrams illustrating operation of the NFT processing server of FIG. 1.

DETAILED DESCRIPTION

Figure 1:
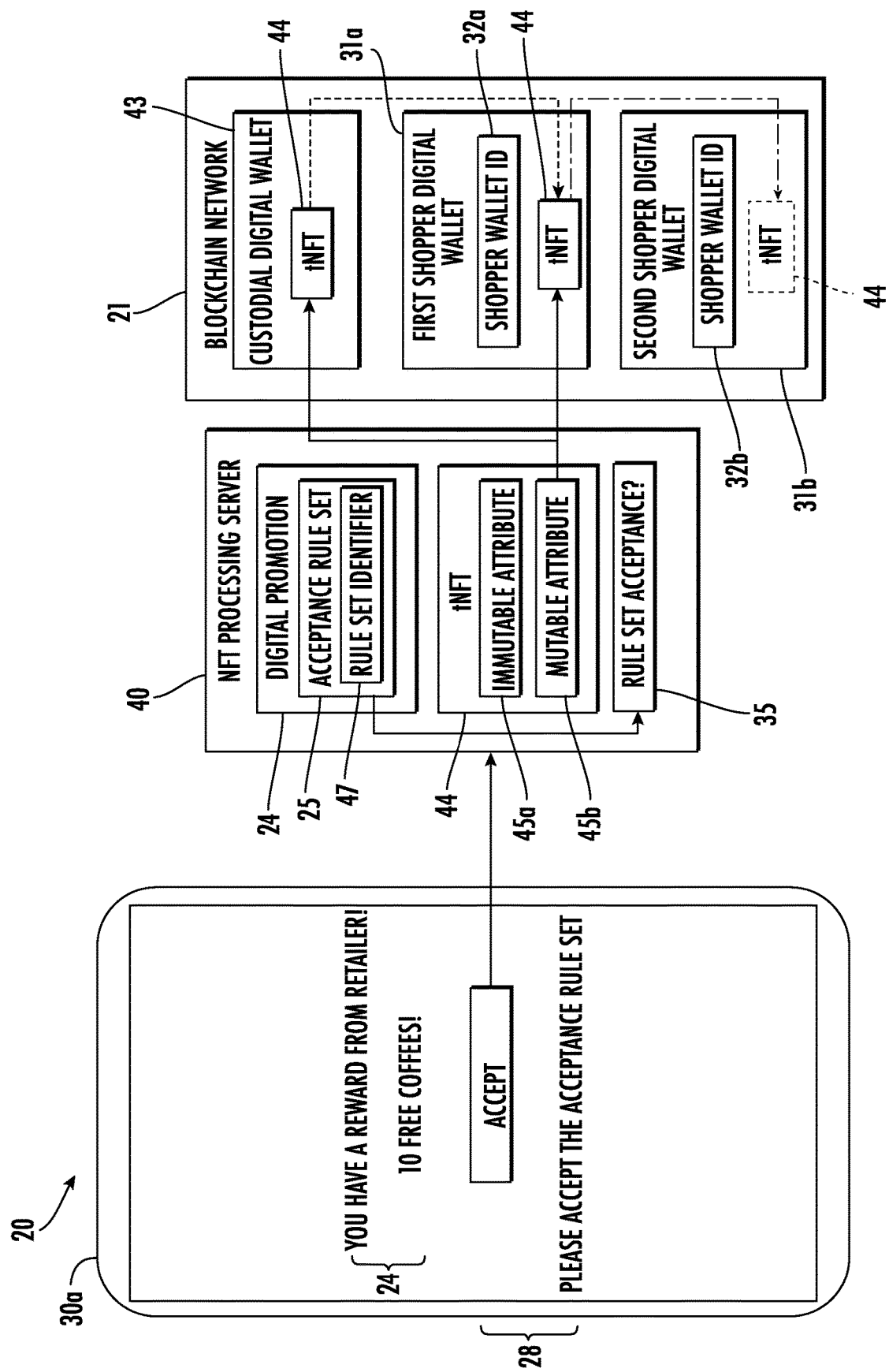
FIG. 1 is a schematic diagram of an NFT system in accordance of an embodiment.
Figure 2:
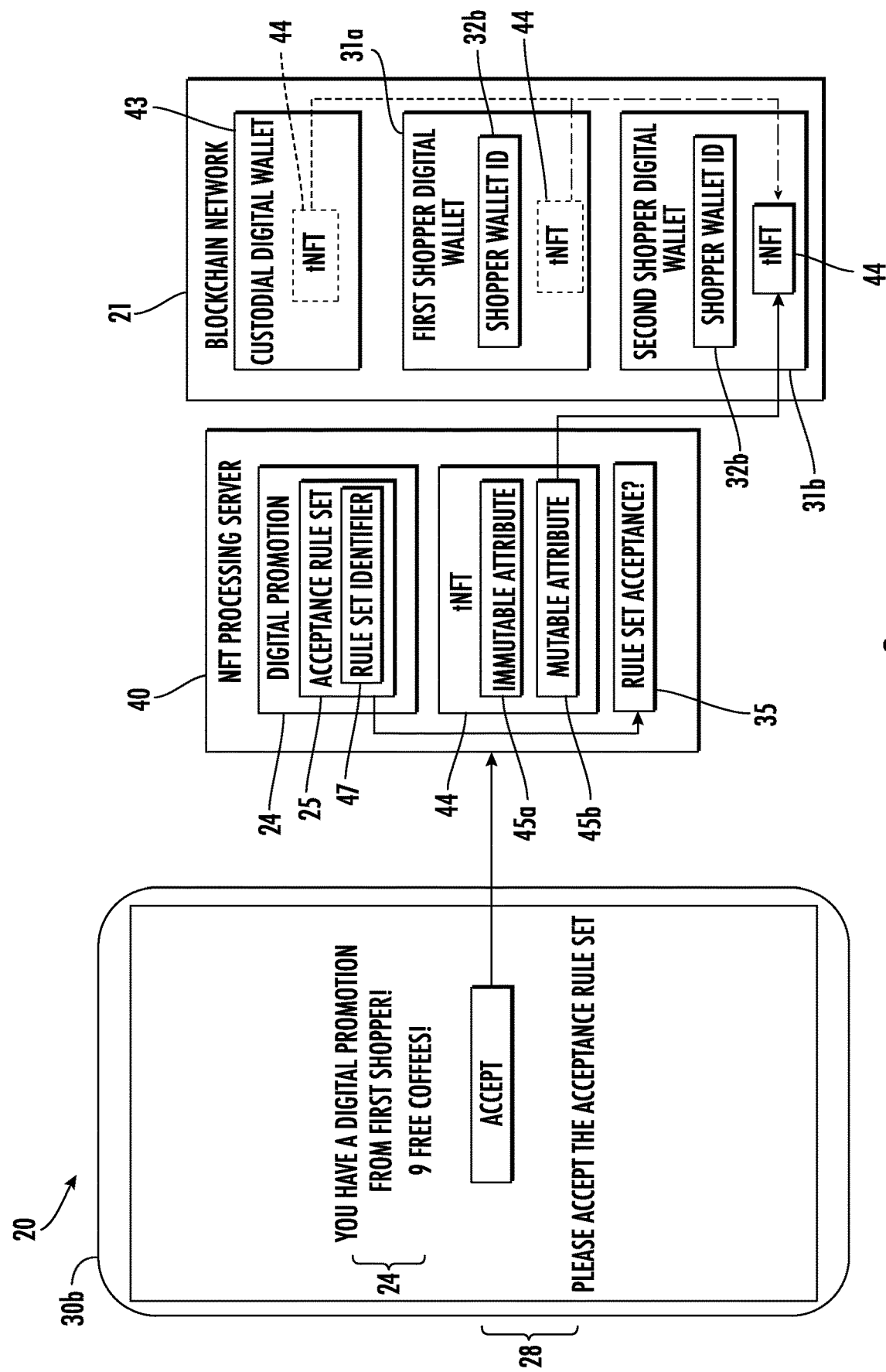
FIG. 2 is a schematic diagram of the NFT system of FIG. 1 illustrating transfer of the digital promotion to the second shopper.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-4, a non-fungible token (NFT) system 20 includes a first shopper device 30a associated with a first shopper. The first shopper device 30a is illustratively in the form of a mobile wireless communications device, and more particularly, a mobile or smart phone. The first shopper device 30a may be in the form of another type of device, for example, a personal computer, a tablet computer, a laptop computer, or a wearable computer. The first shopper may have a first shopper digital wallet 31a on a blockchain network 21. The blockchain network 21 may be a public blockchain network, for example, as will be appreciated by those skilled in the art. An exemplary blockchain network 21 may include Ethereum, Solana, Cardano, Wax, or other blockchain network, for example. The first shopper digital wallet 31a may be for storing NFTs related to or representative of digital promotions, for example, digital coupons, offers, loyalty program information, etc., as will be described in further detail below. The first shopper digital wallet 31a may have a first shopper digital wallet identifier 32a associated therewith.

The NFT system 20 also includes a second shopper device 30b associated with a second shopper. The second shopper device 30b is also illustratively in the form of a mobile wireless communications device, and more particularly, a mobile or smart phone. The second shopper device 30b may be in the form of another type of device, for example, a personal computer, a tablet computer, a laptop computer, or a wearable computer. The second shopper may have a second shopper digital wallet 31b on the blockchain network 21. The second shopper digital wallet 31b may be for storing NFTs related to or representative of digital promotions, for example, digital coupons, offers, loyalty program information, etc., as will be described in further detail below. The second shopper digital wallet 31b may have a second shopper digital wallet identifier 32b associated therewith.

Figure 3:
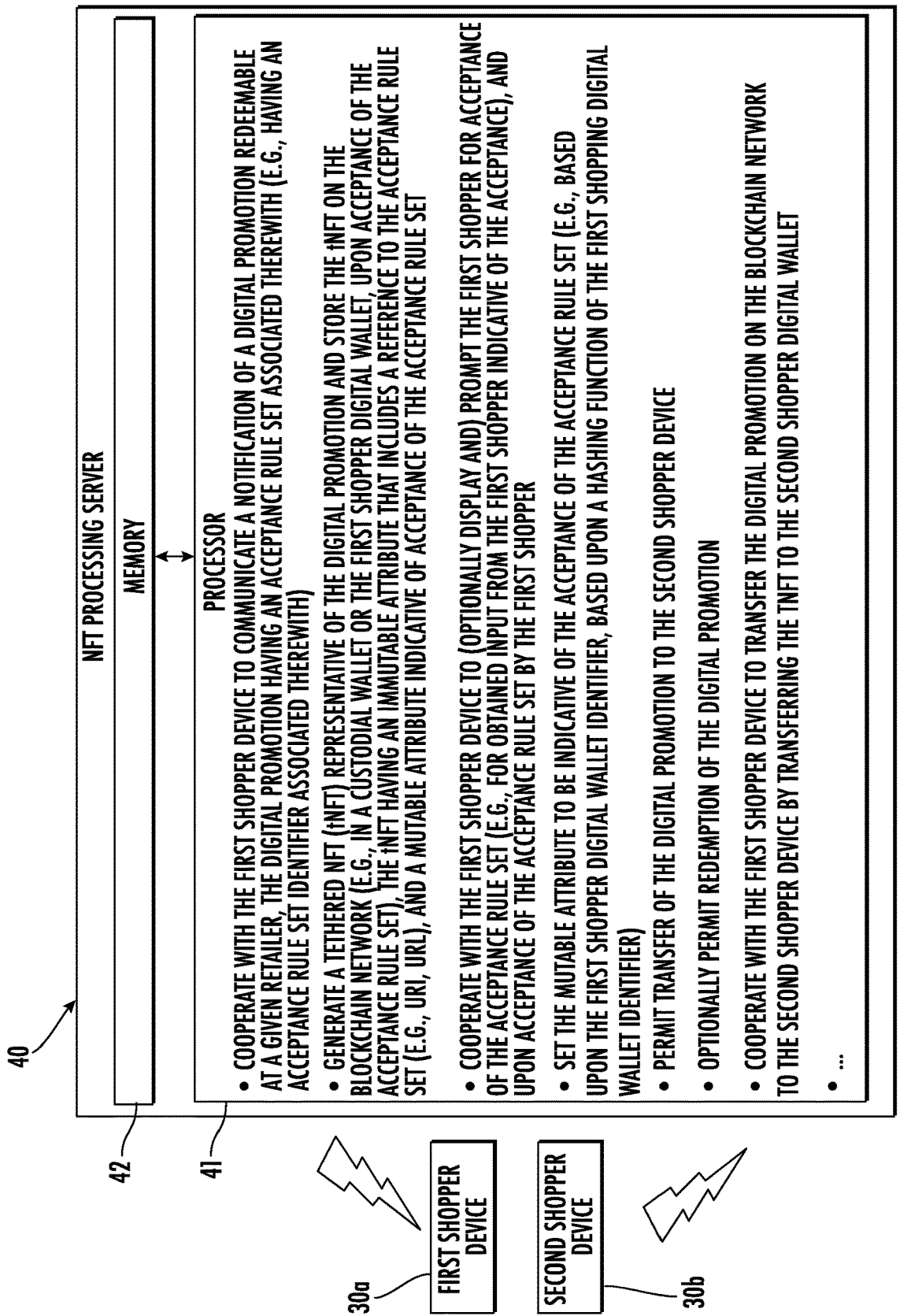
FIG. 3 is a schematic block diagram of a portion of the NFT processing server of FIG. 1.
Figure 4:
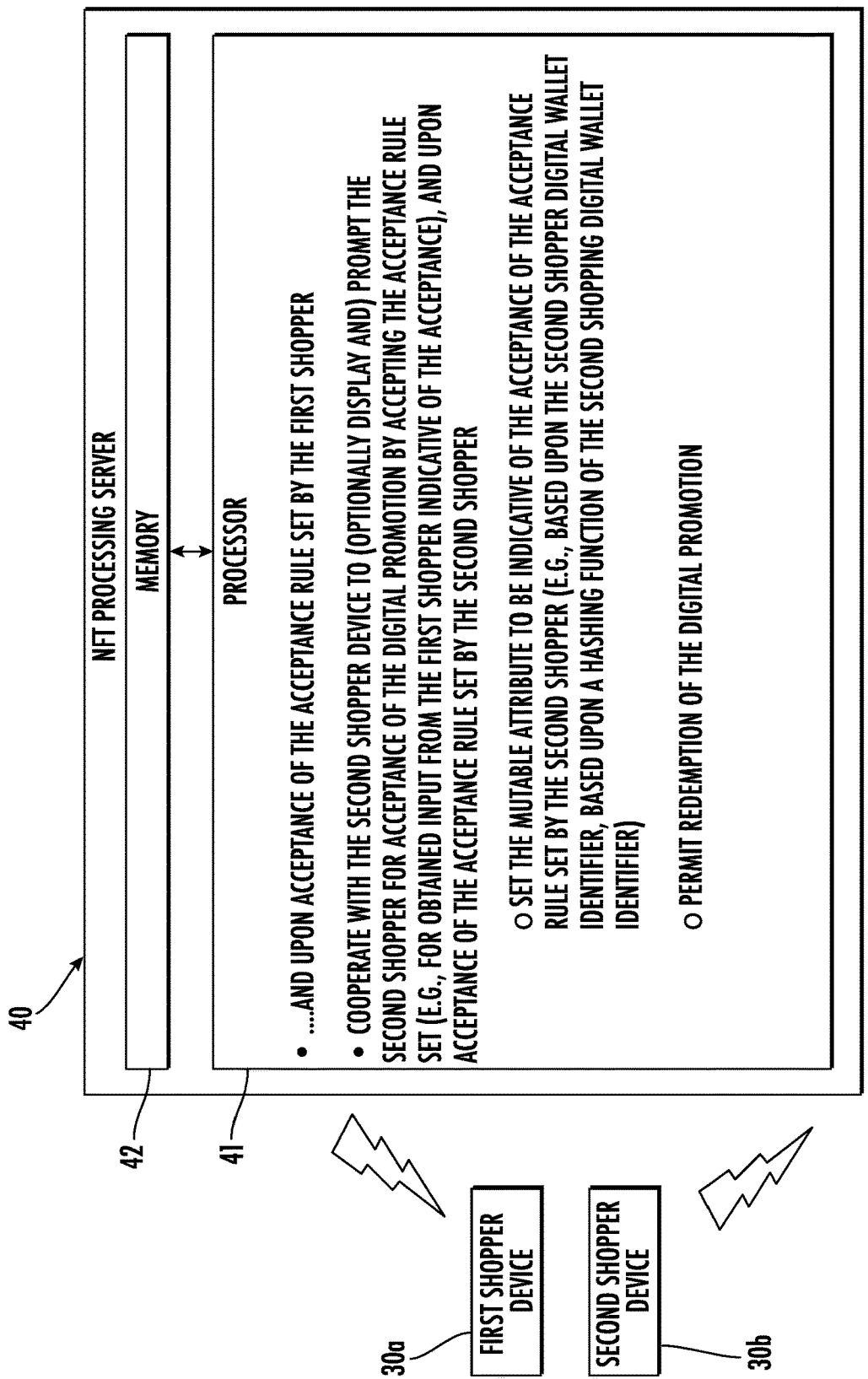
FIG. 4 is a schematic block diagram of another portion of the NFT processing server of FIG. 1.

The NFT system 20 also includes an NFT processing server 40. The NFT processing server 40 includes a processor 41 and an associated memory 42 (FIGS. 3-4). While operations of the NFT processing server 40 are described herein, it should be understood that the processor 41 and the memory 42 cooperate to perform the operations.

Figure 5B:
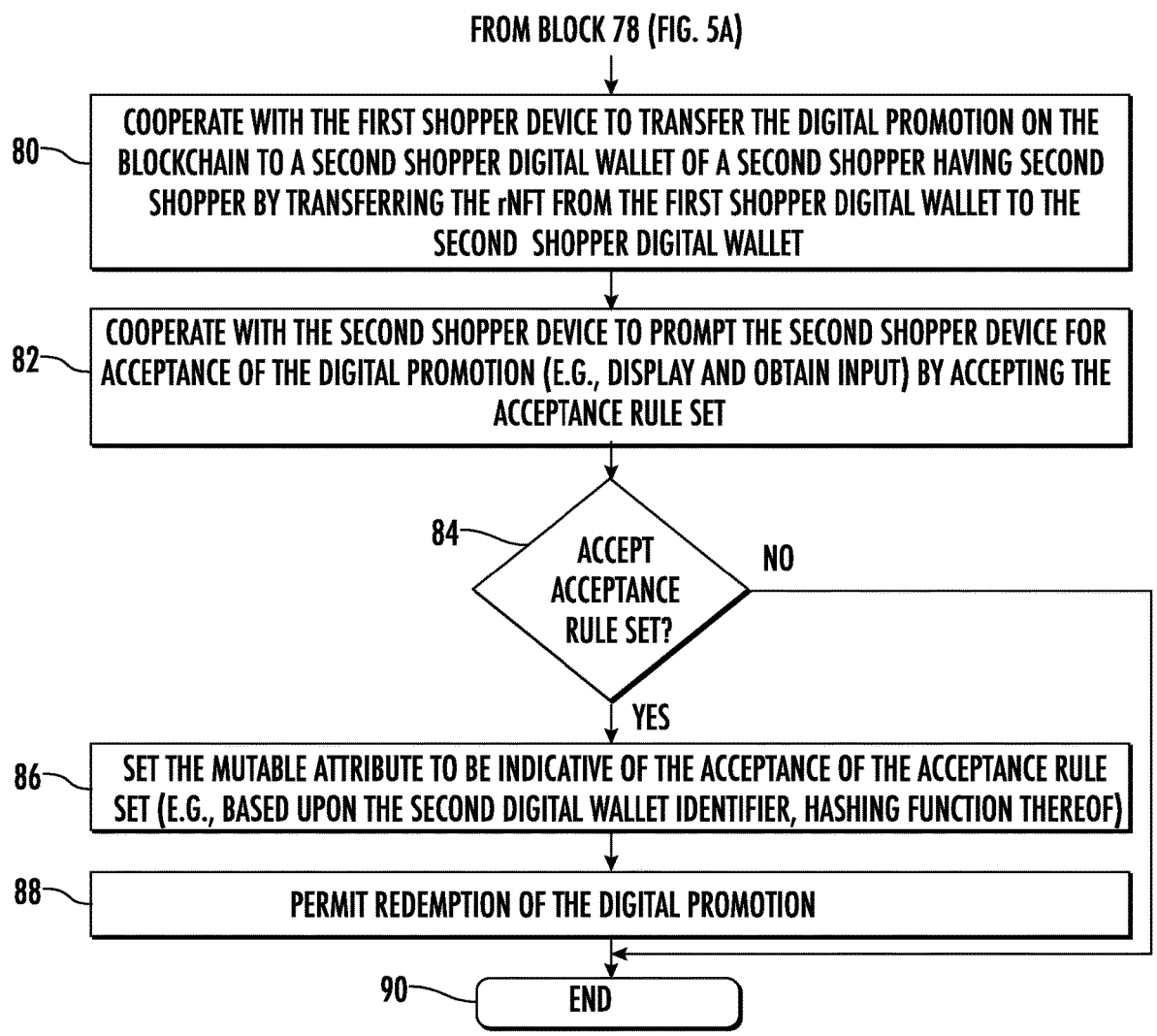

Referring now additionally to the flowchart 60 in FIGS. 5A-5B, beginning at Block 62, operations of the NFT processing server 40 will now be described. At Block 64, the NFT processing server 40 cooperates with the first shopper device 30a to communicate a notification 23 of a digital promotion 24 redeemable at a given retailer. The given digital promotion 24 may be in the form of a digital coupon, for example, for a given dollar amount off a purchase (e.g., or a given product) at the given retailer. The digital promotion 24 may be targeted to the given shopper, for example, based upon basket level data (i.e., products being purchased during a purchase transaction). An exemplary digital promotion 24 may be for "free coffee on Mondays" at the given retailer, or for "10-free coffees" (FIG. 1). Another exemplary digital promotion 24 may be a monetary or dollar value off the purchase of a given product for purchase at the given retailer.

The digital promotion 24 has an acceptance rule set 25 associated therewith. The acceptance rule set 25 may include terms and conditions for the digital promotion 24 and/or a transfer rule set, for example. The acceptance rule set 25 may thus be considered a legal license agreement between the first shopper and the issuer of the digital promotion 24. The acceptance rule set 25 may have an acceptance rule set identifier 47 associated therewith. As will be appreciated by those skilled in the art, an acceptance rule set 25 is typically accepted by the end user, in this case, the first shopper, to accept the digital promotion 24.

The NFT processing server 40, at Block 66, generates a tethered NFT (tNFT) 44. The tNFT 44 is representative of the digital promotion 24. In other words, the tNFT 44 is the digital promotion embodied as an NFT. The NFT processing server 40 stores the tNFT 44 on the blockchain network 21 (Block 68).

In an embodiment, the NFT processing server 40 may store the tNFT 44 in a custodial wallet 43 that may be associated with the given retailer, for example, and for the benefit of the first shopper or subsequent shoppers as will be described in further detail below. Once the digital promotion 24 is claimed by the first shopper, for example, or upon redemption, the tNFT 44 may be stored or moved from the custodial wallet 43 to the first shopper digital wallet 31*a*.

The tNFT 44 has both an immutable attribute 45*a* and a mutable attribute 45*b*. The immutable attribute 45*a* includes a reference to the acceptance rule set 25. More particularly, the reference may include a uniform resource locator (URL) or uniform resource identifier (URI) to the acceptance rule set 25 or to the contract or terms and conditions of the digital promotion 24. The URL or URI may identify the specific acceptance rule set 25 or contract or contract instance (in the case of a URI), or point to the address of the acceptance rule set at a specific service address (e.g., a hypertext transfer protocol (HTTP) address). In other words, the retailer or issuer of the digital promotion 24 may thus desire acceptance of the acceptance rule set 25 either at the time of minting of the tNFT 44 (into the custodial wallet 43) or at the time of claiming (i.e., redemption, transferring the tNFT from the custodial wallet 43 to the first shopper digital wallet 31*a*.

At Block 70, the NFT processing server 40 cooperates with the first shopper device 30*a* to prompt the first shopper for acceptance of the digital promotion 24 by accepting the acceptance rule set 25. The prompting may occur upon minting or generating of the tNFT 44 into the custodial wallet 43 or upon transfer (e.g., redemption) of the tNFT to the first shopper digital wallet 31*a*. The prompt 28 may display the acceptance rule set 25 on the first shopper device 30*a* and request input from the first shopper in the form of input to the first shopper device corresponding to the acceptance (or denial) of the acceptance rule set. For example, the first shopper may provide touch input to a touch screen of the first shopper device 30*a* to indicate acceptance (or denial) of the acceptance rule set 25.

If, at Block 72, the first shopper does not accept (or denies) the acceptance rule set 25, operations end at Block 90. In other words, the digital promotion 24 is not redeemable by the first shopper, for example, as if the first shopper did not receive the digital promotion.

If, at Block 72, the first shopper accepts the acceptance rule set 25 (rule set acceptance 35), the NFT processing server 40 sets the mutable attribute 45*b* to be indicative of the acceptance of the acceptance rule set 25 (Block 74) or may be considered proof of acceptance of the acceptance rule set. The mutable attribute 45*b* may be set based upon the first shopper digital wallet identifier 32*a*, for example. The mutable attribute 45*b* may also be set based upon the acceptance rule set identifier 47. The mutable attribute 45*b* may also be set based upon a hashing function that accepts as input the first shopper identifier. Exemplary pseudocode maybe be expressed as:

ProofOfAcceptance:<hashOf>(Proofstring)

The <hashOf> function may be any hash function that may be considered to be cryptographically strong, such as SHA-256. Of course, other cryptographically strong hashing algorithms may be used, as will be appreciated by those skilled in the art. The (Proofstring) may be generated by concatenating the first digital wallet identifier 32*a* with a nonce and based upon a definition of the acceptance rule set 25. For example:

<first digital wallet identifier>-<nonce>-<acceptance rule set identifier>-<acceptance rule set version>-<serialized acceptance rule set parameterization>.

The above assumes an acceptance rule set that is generated from a parameterized acceptance rule set template using at least some fixed, e.g., user-specific, set of parameters.

In another example, the (Proofstring) may be represented by:

<first digital wallet identifier>-<nonce>-<full acceptance rule set text>.

The above may permit tracking of acceptance of a literal, unaltered text of the acceptance rule set 25. However, as will be appreciated by those skilled in the art, by accepting a literal, unaltered version of the acceptance rule set 25, may come at a cost of losing the ability to maintain some desirable metadata associated with the acceptance rule set. Moreover, the mutable nature of the mutable attribute 45*b* may permit the owner of the tNFT 44 to alter the tNFT, for example, by way of the acceptance rule set 25, but this comes at the inconvenience of the shopper (e.g., owner or downstream shopper) having to accept the acceptance rule set again.

The nonce may be set to a unique and cryptographically strong value, for example. The nonce may be generated by the NFT processing server 40 for each acceptance operation of the acceptance rule set 25. The nonce may not be exposed to the users or shoppers, which may be particularly useful for reducing the chances of a reply attack, as will be appreciated by those skilled in the art.

The NFT processing server 40, also upon acceptance of the acceptance rule set (Block 72), permits transfer of the digital promotion 24 to the second shopper device 30*b* (Block 76), for example, when the first shopper is desirous of transferring (e.g., gifting, after a partial redemption). The NFT processing server 40, when the first shopper is desirous of transferring the digital promotion 24 (Block 78) cooperates with the first shopper device 30*a* to transfer the digital promotion on the blockchain network 21 to the second shopper device 30*b* by transferring the tNFT 44 to the second shopper digital wallet 31*b* (Block 80).

At Block 82, the NFT processing server 40 cooperates with the second shopper device 30*b* to prompt the second shopper for acceptance of the digital promotion 24 by accepting the acceptance rule set 25. Similarly to the first shopper, the prompt 28 may display the acceptance rule set 25 on the second shopper device 30*b* and request input from the second shopper in the form of input to the second shopper device corresponding to the acceptance (or denial) of the acceptance rule set. For example, the second shopper may provide touch input to a touch screen of the second shopper device 30*b* to indicate acceptance (or denial) of the acceptance rule set 25.

The NFT processing server 40, upon acceptance of the acceptance rule set 25 by the second shopper (Block 84), sets the mutable attribute 45b to be indicative of the acceptance of the acceptance rule set (Block 86), for example, similarly to the processes described above with respect to the first shopper and first shopper device 30a. For example, the NFT processing server 40 sets the mutable attribute 45b to be indicative of the acceptance of the acceptance rule set 25 based upon the second shopper digital wallet identifier 32b and a hashing function applied to the second shopper digital wallet identifier. Other parameters for setting the mutable attribute 45b may be used as it relates to the second shopper, for example, the acceptance rule set identifier 47, and/or other parameters or operations described above with respect to the first shopper.

The NFT processing server 40 may optionally generate and communicate a further digital promotion. The NFT processing server 40 may communicate the further digital promotion for another product, for example, different product than the product associated with the digital promotion 24. The further digital promotion may be considered a targeted digital promotion, for example, and may be generated and communicated based upon the first and/or second (e.g., and/or further) shopper wallet identifiers 32a, 32b. In other words, the NFT processing server 40 may identify the first and/or second shoppers and, for example, based upon known information about that shopper (e.g., product purchase history, purchasing habits, loyalty program information), generate and communicate the further digital promotion. The above-described operations may be applied to any or other subsequent shoppers desirous of transferring the digital promotion 24.

At Block 88, the NFT processing server 40, upon acceptance of the acceptance rule set 25, may permit redemption of the digital promotion 24. Those skilled in the art will appreciate that while the redemption is illustratively permitted upon the second shopper accepting the acceptance rule set 25, redemption may similarly be permitted for the first shopper or shoppers subsequent to the second shopper that accept the acceptance rule set. Further details of an exemplary redemption are described in U.S. patent application Ser. No. 18/206,994, the entire contents of which are hereby incorporated by reference. Operations end at Block 90.

As will be appreciated by those skilled in the art, the use of the mutable attribute as a mechanism for proof of acceptance may advantageously provide a validation server to cryptographically validate: which blockchain address or identifier was used to accept the acceptance rule set 25 (i.e., which address hold the tNFT 44 at the time of acceptance); the exact text of the acceptance rule set that was accepted (and if a new acceptance is needed for a newer version); and that no "replay attack" has occurred. Additionally, optionally, acceptance of the acceptance rule set 25 may be cryptographically signed by the shopper digital wallet, which may help ensure non-repudiation of the acceptance of the acceptance rule set.

A method aspect is directed to a method of processing a non-fungible token (NFT). The method includes using a digital wallet server 40 to cooperate with a first shopper device 30a associated with a first shopper to communicate a notification 23 of a digital promotion 24 having an acceptance rule set 25 associated therewith, and generate a tethered NFT (tNFT) 44 representative of the digital promotion and store the tNFT on a blockchain network 21. The tNFT has an immutable attribute 45a that includes a reference to the acceptance rule set 25, and a mutable attribute 45b indicative of acceptance of the acceptance rule set. The method also includes using the NFT processing server 40 to cooperate with the first shopper device 30a to prompt the first shopper for acceptance of the digital promotion 24 by accepting the acceptance rule set 25, and, upon acceptance of the acceptance rule set by the first shopper, set the mutable attribute 45b to be indicative of the acceptance of the acceptance rule set 25, and permit transfer of the digital promotion 24 to a second shopper device 30b associated with a second shopper. The method also includes using the NFT processing server 40 to, upon acceptance of the acceptance rule set 25 by the first shopper cooperate with the first shopper device 30a to transfer the digital promotion 24 on the blockchain network 21 to the second shopper device 30b by transferring the tNFT 44 to a second shopper digital wallet 31b on the blockchain network, and cooperate with the second shopper device to prompt 28 the second shopper for acceptance of the digital promotion by accepting the acceptance rule set. The method further includes using the NFT processing server 40 to, upon acceptance of the acceptance rule set 25 by the second shopper, set the mutable attribute 45b to be indicative of the acceptance of the acceptance rule set by the second shopper.

A computer readable medium aspect is directed to a non-transitory computer readable medium for processing a non-fungible token (NFT). The non-transitory computer readable medium includes computer executable instructions that when executed by a processor 41 cause the processor to perform operations. The operations include cooperating with a first shopper device 30a associated with a first shopper to communicate a notification 23 of a digital promotion 24 having an acceptance rule set 25 associated therewith, and generating a tethered NFT (tNFT) 44 representative of the digital promotion and store the tNFT on a blockchain network 21. The tNFT has an immutable attribute 45a that includes a reference to the acceptance rule set 25, and a mutable attribute 45b indicative of acceptance of the acceptance rule set. The operations also include cooperating with the first shopper device 30a to prompt 28 the first shopper for acceptance of the digital promotion 24 by accepting the acceptance rule set 25, and, upon acceptance of the acceptance rule set by the first shopper setting the mutable attribute 45b to be indicative of the acceptance of the acceptance rule set, and permitting transfer of the digital promotion to a second shopper device 30b associated with a second shopper. The operations further include, upon acceptance of the acceptance rule set 25 by the first shopper, cooperating with the first shopper device 30a to transfer the digital promotion 24 on the blockchain network 21 to the second shopper device 30b by transferring the tNFT 44 to a second shopper digital wallet 31b on the blockchain network, and cooperating with the second shopper device to prompt 28 the second shopper for acceptance of the digital promotion by accepting the acceptance rule set, and upon acceptance of the acceptance rule set by the second shopper, setting the mutable attribute 45b to be indicative of the acceptance of the acceptance rule set by the second shopper.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that That which is claimed is:

1. A non-fungible token (NFT) system comprising:
a first shopper device associated with a first shopper, the first shopper having a first shopper digital wallet on a blockchain network, and the first shopper digital wallet having a first digital wallet identifier associated therewith;
a second shopper device associated with a second shopper, the second shopper having a second shopper digital wallet on the blockchain network, and the second shopper digital wallet having a second digital wallet identifier associated therewith; and
an NFT processing server configured to
cooperate with the first shopper device to communicate a notification of a digital promotion having an acceptance rule set associated therewith,
generate a tethered NFT (tNFT) representative of the digital promotion and store the tNFT on the blockchain network, the tNFT having an immutable attribute comprising a reference to the acceptance rule set, and a mutable attribute indicative of acceptance of the acceptance rule set,
cooperate with the first shopper device to prompt the first shopper for acceptance of the digital promotion by accepting the acceptance rule set, and
in response to acceptance of the acceptance rule set by the first shopper
generate a first shopper nonce having an encrypted and unique first nonce value,
generate a first shopper proofstring based upon concatenation of the first digital wallet identifier with the first shopper nonce and the acceptance rule set,
determine a first shopper proof of acceptance based upon a hashing function accepting as input thereto the first shopper proofstring,
set the mutable attribute to be indicative of the acceptance of the acceptance rule set based upon the first shopper proof of acceptance,
permit at least a partial redemption of the digital promotion by the first shopper based upon the mutable attribute being set to be indicative of acceptance of the acceptance rule set,
permit transfer of the digital promotion to the second shopper device,
cooperate with the first shopper device to transfer the digital promotion on the blockchain network to the second shopper device by transferring the tNFT to the second shopper digital wallet,
cooperate with the second shopper device to prompt the second shopper for acceptance of the digital promotion by accepting the acceptance rule set, and
in response to acceptance of the acceptance rule set by the second shopper
generate a second shopper nonce having an encrypted and unique second nonce value,
generate a second shopper proofstring based upon concatenation of the second digital wallet identifier with the second nonce and the acceptance rule set,
determine a second shopper proof of acceptance based upon the hashing function accepting as input thereto the second shopper proofstring,
set the mutable attribute to be indicative of the acceptance of the acceptance rule set by the second shopper based upon the second shopper proof of acceptance, and
permit at least partial redemption of the digital promotion by the second shopper based upon the mutable attribute being set to be indicative of acceptance of the acceptance rule set.

2. The NFT system of claim 1 wherein the acceptance rule set has an acceptance rule set identifier associated therewith; and wherein the NFT processing server is configured to generate at least one of the first and second shopper proofstrings based upon the acceptance rule set identifier.

3. The NFT system of claim 1 wherein the immutable attributes comprise one of a uniform resource locator (URL) and a uniform resource identifier (URI) to the acceptance rule set.

4. The NFT system of claim 1 wherein the NFT processing server is configured to store the tNFT in the first shopper digital wallet on the blockchain network upon acceptance of the acceptance rule set by the first shopper.

5. The NFT system of claim 1 wherein the NFT processing server is configured to cooperate with the first shopper device to display the acceptance rule set and obtain input from the first shopper indicative of the acceptance.

6. The NFT system of claim 1 wherein the NFT processing server is configured to cooperate with the second shopper device to display the acceptance rule set and obtain input from the second shopper indicative of the acceptance.

7. The NFT system of claim 1 wherein the acceptance rule set has an acceptance rule set version associated therewith; and wherein the NFT processing server is configured to generate at least one of the first and second shopper proofstrings based upon the acceptance rule set version.

8. The NFT system of claim 1 wherein the NFT processing server is configured to generate at least one of the first and second shopper proofstrings based upon a full text of the acceptance rule set.

9. A non-fungible token (NFT) processing server comprising:
a processor and an associated memory configured to
cooperate with a first shopper device associated with a first shopper to communicate a notification of a digital promotion having an acceptance rule set associated therewith, the first shopper having a first shopper digital wallet on a blockchain network, and the first shopper digital wallet having a first digital wallet identifier associated therewith,
generate a tethered NFT (tNFT) representative of the digital promotion and store the tNFT on the blockchain network, the tNFT having an immutable attribute comprising a reference to the acceptance rule set, and a mutable attribute indicative of acceptance of the acceptance rule set,
cooperate with the first shopper device to prompt the first shopper for acceptance of the digital promotion by accepting the acceptance rule set, and
in response to acceptance of the acceptance rule set by the first shopper
generate a first shopper nonce having an encrypted and unique first nonce value,
generate a first shopper proofstring based upon concatenation of the first digital wallet identifier with the first shopper nonce and the acceptance rule set,
determine a first shopper proof of acceptance based upon a hashing function accepting as input thereto the first shopper proofstring, set the mutable attribute to be indicative of the acceptance of the acceptance rule set based upon the first shopper proof of acceptance, permit at least partial redemption of the digital promotion by the first shopper based upon the mutable attribute being set to be indicative of acceptance of the acceptance rule set, permit transfer of the digital promotion to a second shopper device associated with a second shopper, cooperate with the first shopper device to transfer the digital promotion on the blockchain network to the second shopper device by transferring the tNFT to a second shopper digital wallet on the blockchain network, the second shopper digital wallet having a second digital wallet identifier associated therewith, cooperate with the second shopper device to prompt the second shopper for acceptance of the digital promotion by accepting the acceptance rule set, and in response to acceptance of the acceptance rule set by the second shopper generate a second shopper nonce having an encrypted and unique second nonce value, generate a second shopper proofstring based upon concatenation of the second digital wallet identifier with the second nonce and the acceptance rule set, determine a second shopper proof of acceptance based upon the hashing function accepting as input thereto the second shopper proofstring, set the mutable attribute to be indicative of the acceptance of the acceptance rule set by the second shopper based upon the second shopper proof of acceptance, and permit at least partial redemption of the digital promotion by the second shopper based upon the mutable attribute being set to be indicative of acceptance of the acceptance rule set.

10. The NFT processing server of claim 9 wherein the acceptance rule set has an acceptance rule set identifier associated therewith; and wherein the processor is configured to generate at least one of the first and second shopper proofstrings based upon the acceptance rule set identifier.

11. The NFT processing server of claim 9 wherein the immutable attributes comprise one of a uniform resource locator (URL) and a uniform resource identifier (URI) to the acceptance rule set.

12. The NFT processing server of claim 9 wherein the NFT processing server is configured to store the tNFT in the first shopper digital wallet on the blockchain network upon acceptance of the acceptance rule set by the first shopper.

13. The NFT processing server of claim 9 wherein the acceptance rule set comprises an acceptance rule set version; and wherein the processor is configured to generate at least one of the first and second shopper proofstrings based upon the acceptance rule set version.

14. The NFT processing server of claim 9 wherein the processor is configured to generate at least one of the first and second shopper proofstrings based upon a full text of the acceptance rule set.

15. A method of processing a non-fungible token (NFT) comprising:

using an NFT processing server to cooperate with a first shopper device associated with a first shopper to communicate a notification of a digital promotion having an acceptance rule set associated therewith, the first shopper having a first shopper digital wallet on a blockchain network, and the first shopper digital wallet having a first digital wallet identifier associated therewith, generate a tethered NFT (tNFT) representative of the digital promotion and store the tNFT on the blockchain network, the tNFT having an immutable attribute comprising a reference to the acceptance rule set, and a mutable attribute indicative of acceptance of the acceptance rule set, cooperate with the first shopper device to prompt the first shopper for acceptance of the digital promotion by accepting the acceptance rule set, and in response to acceptance of the acceptance rule set by the first shopper generate a first shopper nonce having an encrypted and unique first nonce value, generate a first shopper proofstring based upon concatenation of the first digital wallet identifier with the first shopper nonce and the acceptance rule set, determine a first shopper proof of acceptance based upon a hashing function accepting as input thereto the first shopper proofstring, set the mutable attribute to be indicative of the acceptance of the acceptance rule set based upon the first shopper proof of acceptance, permit at least partial redemption of the digital promotion by the first shopper based upon the mutable attribute being set to be indicative of acceptance of the acceptance rule set, permit transfer of the digital promotion to a second shopper device associated with a second shopper, cooperate with the first shopper device to transfer the digital promotion on the blockchain network to the second shopper device by transferring the tNFT to a second shopper digital wallet on the blockchain network, the second shopper digital wallet having a second digital wallet identifier associated therewith, cooperate with the second shopper device to prompt the second shopper for acceptance of the digital promotion by accepting the acceptance rule set, and in response to acceptance of the acceptance rule set by the second shopper generate a second shopper nonce having an encrypted and unique second nonce value, generate a second shopper proofstring based upon concatenation of the second digital wallet identifier with the second nonce and the acceptance rule set, determine a second shopper proof of acceptance based upon the hashing function accepting as input thereto the second shopper proofstring, set the mutable attribute to be indicative of the acceptance of the acceptance rule set by the second shopper based upon the second shopper proof of acceptance, and permit at least one partial redemption of the digital promotion by the second shopper based upon the mutable attribute being set to be indicative of acceptance of the acceptance rule set.

16. The method of claim 15 wherein the acceptance rule set has an acceptance rule set identifier associated therewith; and wherein using the NFT processing server comprises using the NFT processing server to generate at least one of the first and second shopper proofstrings based upon the acceptance rule set identifier.

17. The method of claim 15 wherein the acceptance rule set comprises an acceptance rule set version; and wherein using the NFT processing server comprises using the NFT processing server to generate at least one of the first and second shopper proofstrings based upon the acceptance rule set version.

18. The method of claim 15 wherein using the NFT processing server comprises using the NFT processing server to generate at least one of the first and second shopper proofstrings based upon a full text of the acceptance rule set.

19. A non-transitory computer readable medium for processing a non-fungible token (NFT), the non-transitory computer readable medium comprising computer executable instructions that when executed by a processor cause the processor to perform operations comprising:
  cooperating with a first shopper device associated with a first shopper to communicate a notification of a digital promotion having an acceptance rule set associated therewith, the first shopper having a first shopper digital wallet on a blockchain network, and the first shopper digital wallet having a first digital wallet identifier associated therewith;
  generating a tethered NFT (tNFT) representative of the digital promotion and store the tNFT on the blockchain network, the tNFT having an immutable attribute comprising a reference to the acceptance rule set, and a mutable attribute indicative of acceptance of the acceptance rule set;
  cooperating with the first shopper device to prompt the first shopper for acceptance of the digital promotion by accepting the acceptance rule set; and
  in response to acceptance of the acceptance rule set by the first shopper
    generating a first shopper nonce having an encrypted and unique first nonce value,
    generating a first shopper proofstring based upon concatenation of the first digital wallet identifier with the first shopper nonce and the acceptance rule set,
    determining a first shopper proof of acceptance based upon a hashing function accepting as input thereto the first shopper proofstring,
    setting the mutable attribute to be indicative of the acceptance of the acceptance rule set based upon the first shopper proof of acceptance,
    permitting at least partial redemption of the digital promotion by the first shopper based upon the mutable attribute being set to be indicative of acceptance of the acceptance rule set,
  permitting transfer of the digital promotion to a second shopper device associated with a second shopper,
  cooperating with the first shopper device to transfer the digital promotion on the blockchain network to the second shopper device by transferring the tNFT to a second shopper digital wallet on the blockchain network, the second shopper digital wallet having a second digital wallet identifier associated therewith,
  cooperating with the second shopper device to prompt the second shopper for acceptance of the digital promotion by accepting the acceptance rule set, and
  in response to acceptance of the acceptance rule set by the second shopper
    generating a second shopper nonce having an encrypted and unique second nonce value,
    generating a second shopper proofstring based upon concatenation of the second digital wallet identifier with the second nonce and the acceptance rule set,
    determining a second shopper proof of acceptance based upon the hashing function accepting as input thereto the second shopper proofstring,
    setting the mutable attribute to be indicative of the acceptance of the acceptance rule set by the second shopper based upon the second shopper proof of purchase, and
    permit at least partial redemption of the digital promotion by the second shopper based upon the mutable attribute being set to be indicative of acceptance of the acceptance rule set.

20. The non-transitory computer readable medium of claim 19 wherein the acceptance rule set has an acceptance rule set identifier associated therewith; and wherein the operations comprise generating at least one of the first and second shopper proofstrings based upon the acceptance rule set identifier.

21. The non-transitory computer readable medium of claim 19 wherein the acceptance rule set comprises an acceptance rule set version; and wherein the operations comprise generating at least one of the first and second shopper proofstrings based upon the acceptance rule set version.

22. The non-transitory computer readable medium of claim 19 wherein the operations comprise generating at least one of the first and second shopper proofstrings based upon a full text of the acceptance rule set.

* * * * *